United States Patent [19]

Beatty

[11] Patent Number: 5,675,630
[45] Date of Patent: Oct. 7, 1997

[54] METHOD FOR ASSOCIATING PHONE BOOKS WITH CELLULAR NAMS

[75] Inventor: Dana L. Beatty, Boca Raton, Fla.

[73] Assignee: International Business Machines Corporation, Armonk, N.Y.

[21] Appl. No.: 396,976

[22] Filed: Mar. 1, 1995

[51] Int. Cl.$^6$ .................................................. H04Q 7/32
[52] U.S. Cl. ....................... 379/59; 379/58; 379/355; 455/33.1
[58] Field of Search .................... 379/58, 59, 60, 379/62, 355, 357; 455/33.1, 33.2

[56] References Cited

U.S. PATENT DOCUMENTS

| | | | |
|---|---|---|---|
| 5,222,127 | 6/1993 | Fukui | 379/58 X |
| 5,384,834 | 1/1995 | Sato et al. | 37/357 X |
| 5,428,666 | 6/1995 | Fyfe et al. | 379/58 |
| 5,448,622 | 9/1995 | Huttunen | 379/58 |
| 5,535,258 | 7/1996 | Joglekar et al. | 379/58 |

FOREIGN PATENT DOCUMENTS 2269512  9/1994  United Kingdom.

OTHER PUBLICATIONS

Newton's Telecom Dicitionary, 8th edition, p. 683. Nov. 1994.

*Primary Examiner*—Dwayne Bost
*Assistant Examiner*—Nay Maung
*Attorney, Agent, or Firm*—George E. Grosser; John C. Black; Barry L. Haley

[57] ABSTRACT

A method of associating features, such as phone number directories, of a mobile communication module with individual NAMs in a communication module having a plurality of NAMs so as to provide accessibility to the directories based on the NAM activated for convenient and efficient access including the steps of establishing and comparing identification codes and further providing the option of changing phone number directories when changing NAMs or receiving the same NAM.

11 Claims, 6 Drawing Sheets

METHOD FOR ASSOCIATING PHONE BOOKS WITH CELLULAR NAMS

BACKGROUND OF THE INVENTION

1. Field of the Invention

This invention relates generally to a method for associating existing phone features with individual number assignment modules and more specifically for allowing the user of a mobile communication device, such as a cellular phone, to automatically associate select phone books with specific carrier phone addresses or numbers assigned to the mobile communications module so that the user may easily reference any phone book as desired regardless of the active NAM.

2. Description of the Prior Art

Many mobile cellular phones allow a user to register a single device with multiple phone numbers from the same or different carriers and store the phone numbers in number assignment modules (NAM's). They also allow a user to create a phone book and define a set of speed dial numbers. A number assignment module (NAM) is the actual number or address by which a carrier identifies a particular phone and by which the phone may be accessed from other cellular and fixed wired conventional phones. Having multiple phone numbers or carriers registered NAM's on a single phone allows the user to activate different phone numbers. This feature is useful for many reasons. For instance, it allows a user to have several unique numbers with separate billing accounts wherein one number may be used for personal calls and the others for business purposes. Having multiple phone numbers assigned to a single phone also allows the user to switch to local carriers when traveling to different locations, such as Florida, New York, and California, so that they benefit from the local charges in that area.

The phone number or numbers assigned by a carrier to identify the phone are typically stored in a module known as a number assignment module or NAM. Number assignment modules (NAMs) are the memory means by which an identifying set of telephone numbers exclusive to a particular phone are physically stored in the cellular phone. NAMs may be either RAM, ROM or PROM type memory banks which can store multiple numbers. A cellular phone only operates under one phone number assignment at a time but may switch between different phone number assignments to operate under the desired number. NAMs may be configured by designated key strokes or by an application program that issues "AT" commands to activate certain NAMs. An "AT" command is an industry standard means of communicating with a modem. The industry uses AT commands for many applications. In this implementation, a specific AT command acts as a switch causing a particular NAM to be "active."

As noted above, mobile communications modules, or cellular phones may have microprocessors which program phone number assignments into individual NAM locations. Cellular phones today are typically programmed with a select number of NAMs for storing a corresponding number of carrier number assignments. For instance, the IBM CDPD Mobile Communications Module (trademark of International Business Machines) include or contains a cellular phone having four NAMs which stores up to four phone number addresses or assignments. The microprocessors in many of today's cellular or mobile phones also provide actual phone books for storing business and personal phone numbers. This allows a user to easily reference phone numbers for dialing and to perform speed dial operations. In addition, the latest models of mobile or cellular phones are being designed for computer compatibility wherein the phone has an adapter which electrically ties it into a portable computer, such as the IBM ThinkPad 750 (trademark of International Business Machines) to benefit from the computer's own microprocessor and phone books. The IBM CDPD mobile communications module is one such phone which fits inside the ThinkPad 750. This is different from conventional cellular phones which are tethered to a modem rather than a computer. The computer tethered phones provide a means for the computer to send data, over the cellular network. Currently, only the IBM CDPD Mobile Communications Module uses the computer for this purpose. The NAMs for these phones are defined by the corresponding computer software. Whether a phone has its own microprocessor or operates from a portable computer, many cellular phones have the ability to store multiple phone number assignments, but have been limited to one phone book which is active for all NAM's. Consequently, when a user changes to a different NAM, the speed dial directories and phone books remain static.

Thus, in conventional phone book and speed dial numbers are only configured relative to a specific NAM. Therefore, when the user switches from the default NAM to an auxiliary NAM the speed dial and phone book features remain static and possibly useless or inaccurate for that NAM. Since no method or apparatus exist for associating phone number directories with individual NAMs as they are activated, there exists a need for a method and mobile communication module system that allows the user to establish multiple phone book and speed dial directories and to automatically associate these features with any selected NAM. Such a feature would be especially useful to business users having different sets of customers or clients in different locations and to people that frequently travel between select locations.

The idea of allowing or facilitating phone books to be selectively associated with any desired NAM setting has not been addressed since computer compatible phones and phones with microprocessors have not been previously provided with enabling software that allows a cellular device to incorporate multiple phone books and NAMs. Accordingly, the process of selectively associating phone books with NAMs is not readily obvious. While there may exist several cellular phones and devices which scan NAMs, and access phone book and speed dial information, as noted below, they do not address the problems noted by the present invention. The idea of allowing or facilitating phone books to be associated with multiple NAM registers has not been addressed by the background art. Moreover, the systems known typically are not software driven and are therefore incapable of freely associating phone books and speed dial registers with selected NAM settings as desired.

For instance, Grimmett et al., U.S. Pat. No. 5,259,018, discloses a radio telephone system having a handset adapted to be removably connected and containing a NAM for storing a telephone number identifying the handset. Grimmett et al. merely addresses a handset for containing a single NAM rather than a cellular phone or other portable phone means having a plurality of NAMs that may be individually correlated with interchangeable phone books. Arai, U.S. Pat. No. 4,742,560, discloses a mobile radio unit in the cellular wide range mobile communication system having a tracking exchange function and a stored secret number. Arai provides no discussion of interchangeably associating a phone book with a NAM setting selected from a plurality of optional NAM settings. Krolopp et al., in U.S. Pat. No. 5,020,091, discloses an automatic radio telephone registration notification system comprising a process for scanning NAMS stored in a phone system to find the most economical or local telephone number which to operate. The process stores phone numbers in NAMs with corresponding system identification codes and compares the system identification codes with those in memory as it scans through communication channels. When a match is found the radio telephone prompts the user to select a new telephone number, if desired. Krolopp et al. does not, however, address correlating select phone books or speed dial numbers with one corresponding NAM from a menu of optional NAM settings. Koma, in U.S. Pat. No. 5,247,572, discloses an apparatus for controlling the storing of information in a telephone set. Koma comprises a control signal generator that supplies a control signal to the control unit of a telephone set having dial memories that prevents the unintentional erasure of the phone book or quick dial phone number information. In contrast with the present invention, Koma does not address correlating phone books with a select NAM setting. Finally, Duffy et al., U.S. Pat. No. 5,303,288, discloses a multiple mode cellular control device and method for presenting phone books and speed dial data to the phone user. Duffy et al. provides selectable modes for accessing stored telephone numbers either by speed dial codes or alphabetic names associated with each telephone number, however, it does not address an automated method for associating multiple phone books or sets of speed dial numbers with an individual NAM from a provided group of NAMs.

In contrast with the present invention, none of the references noted in the background art provides a method for storing a plurality of NAMs, phone books, and speed dial numbers, and activating a particular phone book and speed dial register for use with a desired NAM. Such a method would provide a useful, convenient, and economical solution to those who require multiple NAMs and phone books. The present invention provides such a novel, useful approach for improving usability of cellular phones.

SUMMARY OF THE INVENTION

It is an object of the present invention to provide an automated method for correlating select phone books and speed dial features of a cellular phone or other portable cellular communication device with individual NAM settings, i.e. modules used to store cellular phone number assignments, at the option of the user when the user switches between the NAMs.

It is also an object of the present invention to provide a method which allows a user of a portable communication device to automatically switch between NAMs without forfeiting the device's features such as speed dial numbers and phone books.

In light of these and other objects, the instant invention provides a method which allows a cellular phone user, or software driven cellular phone user to automatically change NAM settings, i.e. phone number assignments, without forfeiting the relative usefulness of the phone's features, such as speed dial numbers and phone books. That is, the instant invention provides dynamic phone books and speed dial numbers, whereby the user can freely associate auxiliary phone book and speed dial settings with any activated NAM. The present invention is intended for use and implementation with mobile cellular communication devices having more than one number assignment module (NAM) for storing a corresponding number of cellular phone number identifiers. Multiple NAMs allow a user to benefit from "home" service rather than paying "roaming" charges. Thus, when a user changes calling areas they can switch to the NAM that corresponds with that location's local calling area. At the same time, the user, unlike in the past, may connect or associate new or pre-configured phone books and speed dial numbers with any activated NAM and switch between phone books and/or other speed dial numbers when changing the NAM setting. The user while active in any NAM setting may also create new phone books or edit existing phone books and speed dial directories so that the numbers in a particular phone book correspond with local numbers pertinent to an individual NAM entry.

Entries can be created or edited via either an application program or through a telephone keypad. Thus, if a salesman or traveler has several territories which they are responsible for or frequent, they may elect to maintain three or more NAMs to cover those territories by having the carrier program the Nams or by entering the carrier information through the phone key pad depending on the carrier procedures and requirements. A NAM corresponding to a given area is then activated by switching to that NAM for use when within that area. For each of the NAMs, the user may create and associate a phone book having numbers which are pertinent to the particular NAM activated.

Each of the number assignments are stored in individual NAM registers. The user pulls up or scrolls through the NAM options on the display of the phone or computer and activates one by pressing an "enter" button. The instant invention then activates a phone book and/or a speed dial directory which complements the selected NAM entry either automatically or by responding to inputs by the user. The phone books and speed dial directory can be changed after the automatic setting and interchangeably selected to correspond with any registered NAM.

To correlate phone books and/or other speed dial numbers with a particular NAM, the user first selects and activates one of the NAM entries. The NAM setting may be the default NAM, an auxiliary NAM, or a newly configured NAM. As noted above, NAMs are nothing more than number assignment modules which store the service or carrier numbers used exclusively to identify the phone or account under which the phone is operating. When powering up the phone, the default NAM is automatically activated. To select a different or auxiliary NAM, a method such as the user selects a Nam entry and presses an "enter" button, as discussed above.

After selecting the desired NAM, a default phone book and a default speed dial directory corresponding to the NAM are automatically activated. Actually, the user associates the phone book and speed dial directory with a NAM beforehand so when a NAM is selected the corresponding phone book and/or speed dial directory is also activated. However, the user is given an option of selecting an auxiliary phone book and/or speed dial directory to activate. That is, the user may select the default phone book which correlates with the default NAM setting or any auxiliary phone book from a menu of phone book options displayed on the phone or portable phone computer screen, or the user may configure a new phone book. The user may also select and activate any speed dial directory from a menu of options or merely utilize the default directory. Therefore, any phone book or speed dial directory may be selected to associate with any activated NAM at the user's option. Phone books and speed dial registers are usually configured to correspond to a particular NAM and the speed dial directories usually corresponds to a particular phone book. However, any speed dial directory may be activated to associate with any phone book or NAM.

An indicator may be provided in each phone book and speed dial directory to inform the user to which NAM each phone book and speed dial register most conveniently corresponds.

When powering on the phone or mobile cellular communication device the settings are activated. However, the user may configure new NAM settings based on new accounts established with carriers and configure new phone books and speed dial registers. All software may be driven by function keys on the cellular phone or via the computer keyboard which directs the user through the options in a logical, orderly fashion. The application software used for selecting, editing, and configuring new and existing NAMs, phone books, and speed dial directories is typically menu-driven. Therefore, the user may enter into any option, such as the NAMs option, phone book option, or speed-dial options in the software at any time or may completely bypass all these options if the default settings are appropriate for the user's particular needs. If the default settings are appropriate, then the user merely powers-up the phone and operates the phone from those initial settings by either referring to the default phone book for a number, the speed dial directory for a speed dialing function, or merely entering a phone number manually for sending to the target phone to establish a communication connection.

Likewise, speed dial directories may be associated with phone books, whereby the speed dial directory would have the most frequently called numbers as found in the associated phone book. The speed dial directories include a default setting which would match with the particular phone book setting which in turn corresponds with a NAM. Although the speed dial directories are configured to correspond with respective phone books, the speed dial directories may be associated and disassociated with any particular phone book or NAM. That is, the user may select a particular NAM and a corresponding speed dial directory of their choice irrespective of the phone book, in thereby relying on the default phone book. On the other hand, the user may activate a particular NAM, establish a link with the corresponding phone book and speed dial directory, and thereafter activate an auxiliary speed dial directory. Accordingly, the application software of the instant invention provides a method with three degrees of freedom. Any particular NAM may be operated in conjunction with any phone book or speed dial directory combination. The associating and disassociating of phone books, speed dial directories, and NAMs is at the control of the user. The method of the instant invention provides an extremely useful feature for mobile professionals, travelers, or anyone that frequents several different territories.

Phone number directories and speed dial directories may be automatically associated with a particular NAM when that directory is created while the device is active under that NAM. Thus, those directories would be the default directories for that NAM. In addition, the selection and activation of NAMs and corresponding or selected directories may be accomplished or conceptualized by using pointers which are moved by the controlling software, function keys or application program and when a device is powered up or a NAM is activated the pointer automatically points at the first or default settings.

In accordance with these and other objects which will become apparent hereinafter, the instant invention will now be described with particular reference to the accompanying drawings.

DESCRIPTION OF THE PREFERRED EMBODIMENTS

Figure 3:
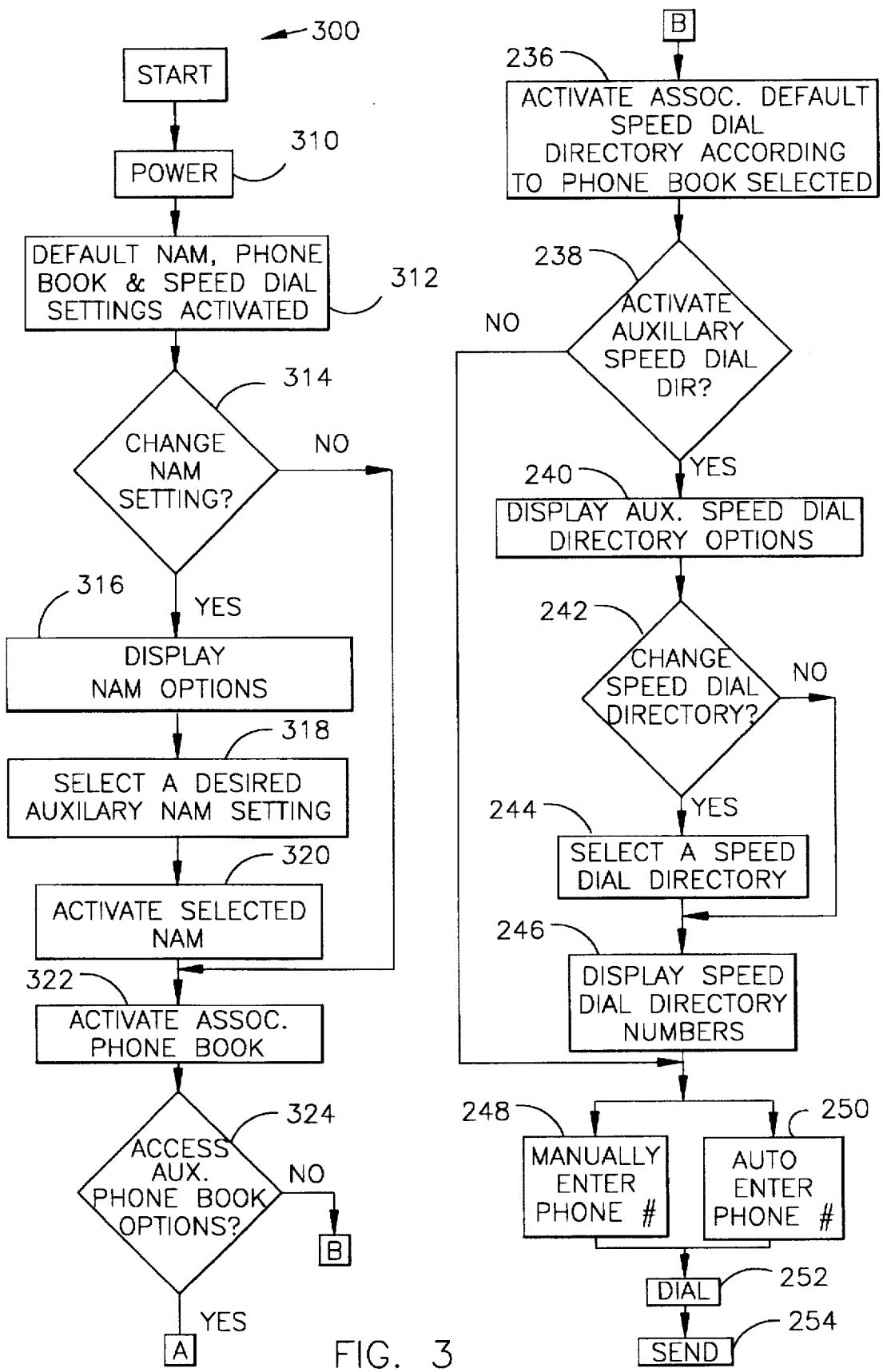
FIGS. 3–3A are flow diagrams illustrating the preferred method of operation of the instant invention in a communication module having a microprocessor with programming capabilities.
Figure 4:
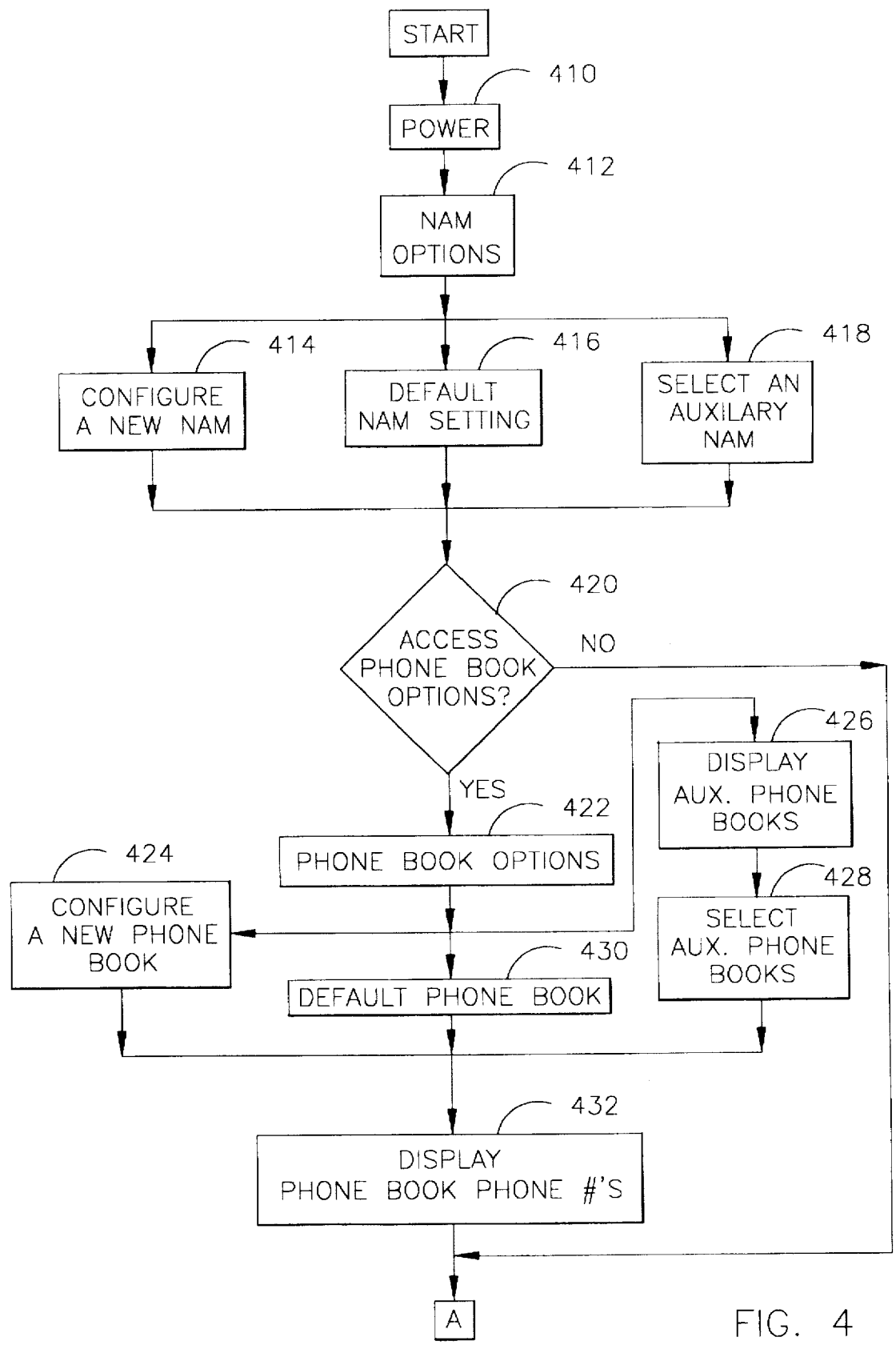
FIGS. 4–4A are flow diagrams illustrating another method of operation of the instant invention in a communication module having a microprocessor with programming capabilities.
Figure 5:
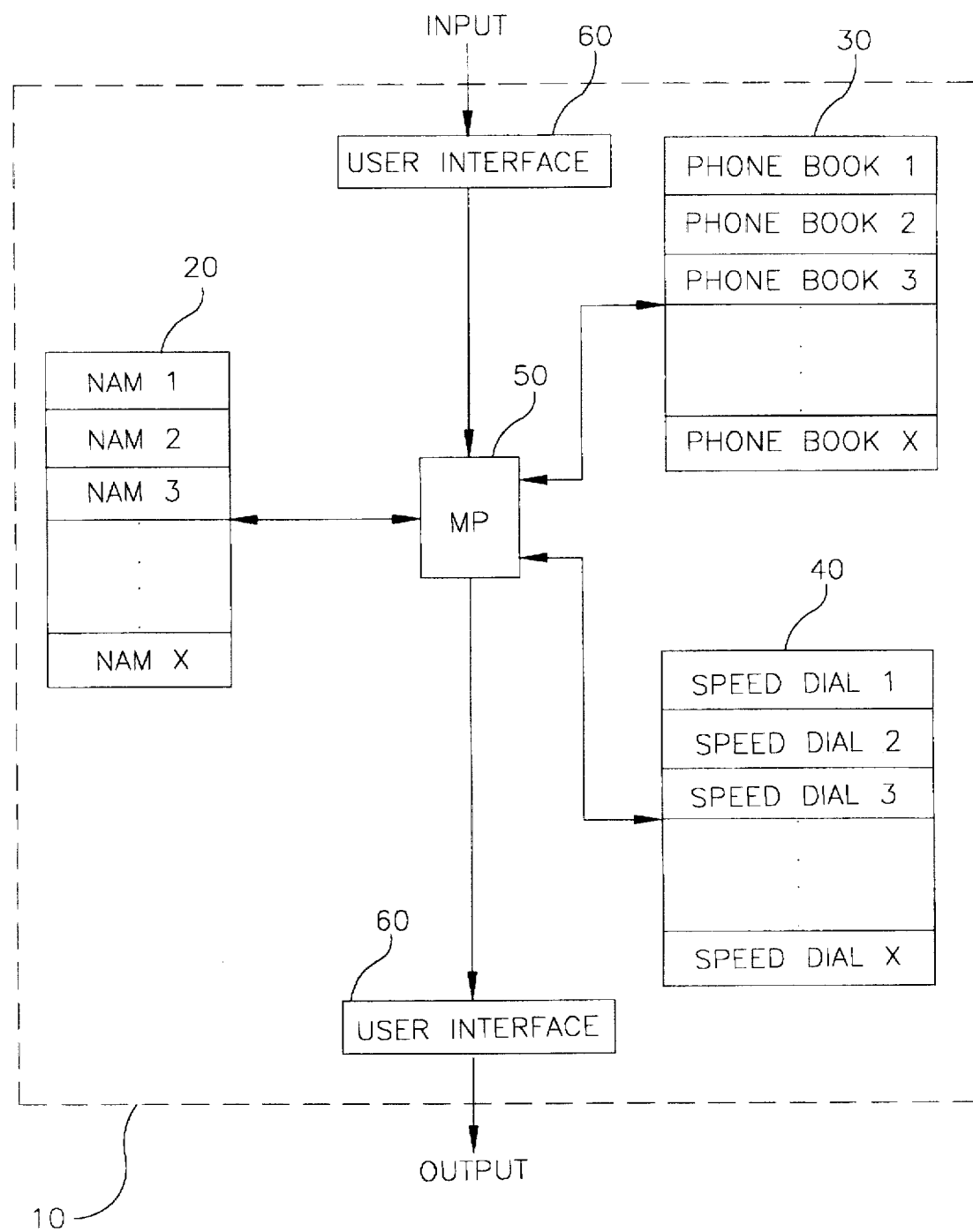
FIG. 5 is a block diagram of the instant invention illustrating the relative communication connections between the controlling microprocessor and the memory devices.

With reference to the drawings, FIGS. 1–4 depict methods for automatically selecting, editing and associating software driven phone books 30 and speed dial directories 40 with cellular NAMs 20 programmed into a cellular phone device 10 in systems similar to that shown in FIG. 5.

The present invention teaches a method for adding, editing or deleting NAMs 20, phone books 30 and speed dial directories 40 and for selectively correlating activated NAMs 20 with any phone book 30 or speed dial directory 40. The instant invention is used with cellular phone devices 10 of the type typically used in cellular communication having two or more number assignment modules (NAMs) 20 and microprocessor 50 capabilities. The present invention associates individual NAMs with phone book features and also programs and stores a plurality of phone book directories and speed dial directories each of which preferably individually correspond to respective NAMs; that is, when one NAM is activated a corresponding phone number directory (e.g. phone book or speed dial directory) is also activated unless changed. The present invention provides a method for activating selected NAMs and phone book and/or speed dial directories for operation in conjunction with the NAM selected. The instant invention also initially activates a default NAM, a default phone book and a default speed dial directory but allows any of the directories to be freely associated with any of the NAM settings which may be changed at any time.

All programming functions, i.e., editing or programming NAMs, phone books, and/or speed dial directories, is done through an application program in a computer, through micro code in a hand held cell phone, or through a phone keypad which operates in conjunction with a microprocessor. Activating the appropriate function keys in a user interface 60, typically having a keypad setup, triggers switches or relays to select the corresponding directory or NAM.

Referring to FIG. 5, a user makes additions, deletions, and changes to phone number directories 30 and 40, and activates NAMs and from the user interface 60. The input is received by the application running on the microprocessor 50 which triggers appropriate switches to activate the NAM, phone book or speed dial directory selected. The microprocessor responds by sending acknowledgements through the output to the user and displaying the directories chosen on the user interface thereby notifying the user that the directories selected are activated. The user then edits or utilizes the NAM, phone book and/or speed dial directory.

Figure 1:
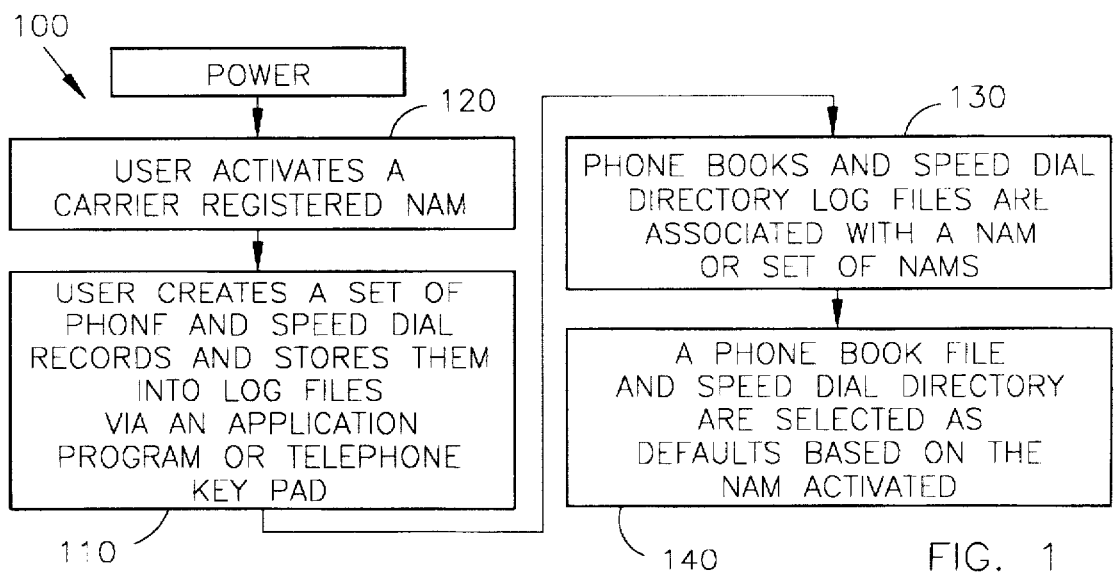
FIG. 1 is a flow diagram illustrating a method of operation of the instant invention used in setting up and associating phone books and speed dial directories with individual NAM settings.

With reference to FIG. 1, a flow diagram 100 illustrates a method of setting up the phone and speed dial directories and associating them with a NAM or set of NAMs. To set up the directories and NAMs, the user first activates a NAM (#xxx) and creates a set of phone and speed dial records 110. Both the phone book and speed dial directories created by the user are given a name and stored under that name into a phone book log file 30 and speed dial directory log file 40, shown in FIG. 5. When the user is desirous of selecting either or both a phone book and speed dial directory, the user merely pulls up the list of phone book and speed dial directory names via the user interface 60 under which the files were stored and makes a selection to activate those files. The phone number files may be scrolled through via their stored names in a one line display or displayed in a menu field in a cellular phone device having a computer display screen, such as a cathode ray tube (CRT), a liquid crystal display (LCD) or some other display.

To associate a phone number directory, such as the phone book file or speed dial directory, the user first activates a NAM from the menu of available NAMs 20 under which the phone is to be operated as shown in block 120 of FIG. 1. Afterwards the user selects and activates a phone book and/or speed dial directory, as shown in block 130, from the log files 30 and 40 to be associated with the activated NAM. To actually activate a NAM, the user either scrolls through the available NAM numbers 20 available or selects one from a menu of options and enters that NAM for activation via the software running on microprocessor 50. This is done either through an application program or through a telephone keypad by hitting the appropriate function key or keys at the user interface 60. In the same way, the phone book or books 30 and/or speed dial directory or directories 40 are selected and activated. That is, the user pulls up the phone book file menu 30 and makes the appropriate selection, entering that selection, thereby associating the selected phone book or phone books with the activated NAM. The user may also activate and associate a speed dial directory with the activated NAM by selecting a particular speed dial directory from a menu of speed dial directory options 40 as previously set up. Finally, with reference to FIG. 1, individual phone book directory files and speed dial directory files may be selected as defaults to coincide with the default NAM.

Figure 2:
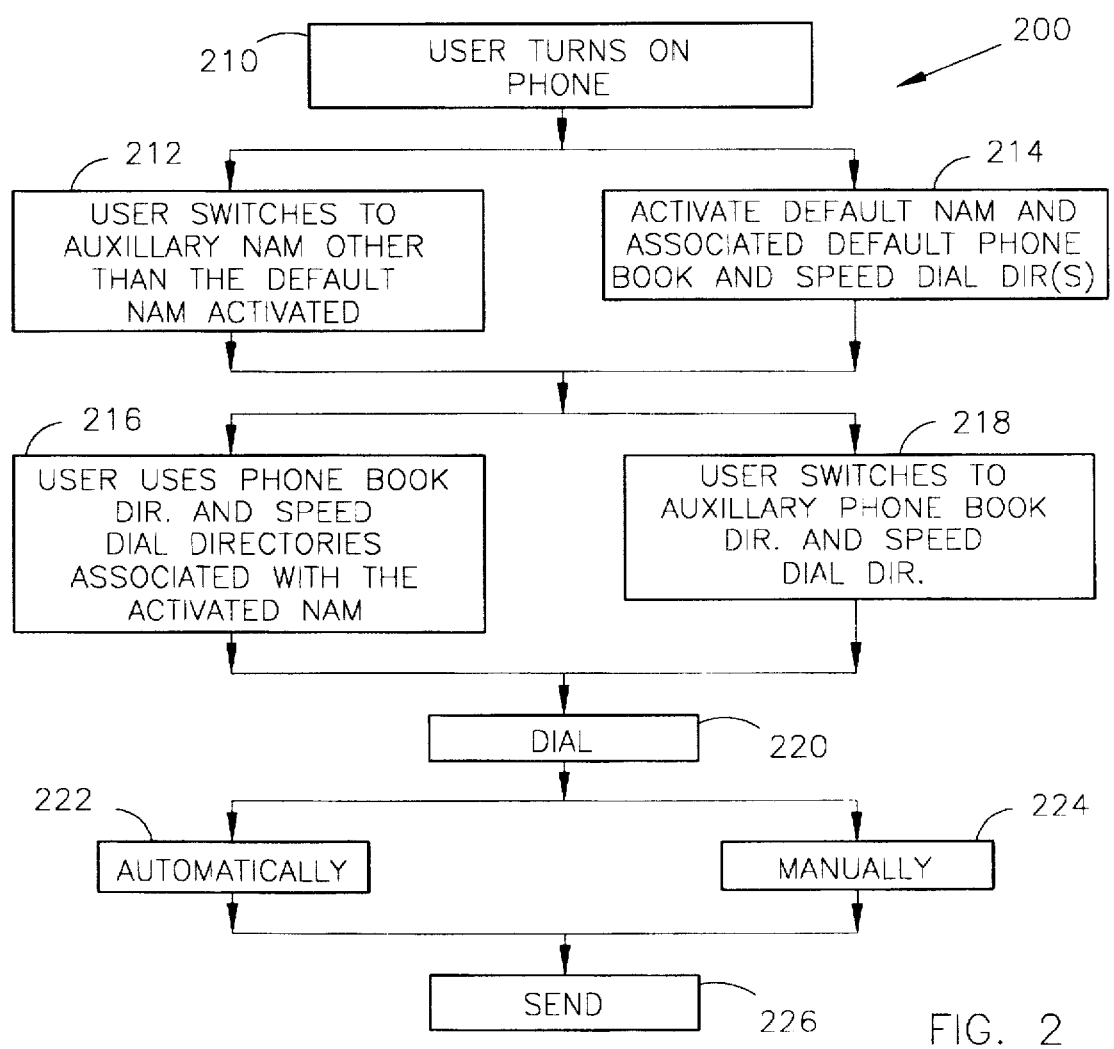
FIG. 2 is a flow diagram illustrating a basic method of operation of the instant invention used in switching between directories and NAMs.

With reference to FIG. 2, a basic operational flow diagram is shown illustrating the more basic steps of the instant invention in its simplest form. As shown in block 210, the user must first turn on the phone. Then the user may operate the phone under the default NAM and the associated phone book and speed dial directories which are automatically active and which were programmed as the default settings to be associated with the default NAM, as shown in block 214. The user, however, may switch to another NAM, i.e. auxiliary NAM, for operating the phone, as seen in block 212. After selecting the NAM and activating it the user then has the option of using the default phone book and default speed dial directory pre-associated with the activated NAM. Typically, the corresponding phone book and speed dial directories preprogrammed to be associated with individual auxiliary NAMs are activated along with the NAM selected by the user. However, the user may opt to change either the phone book directory, speed dial directory or both to an alternate phone book directory and/or speed dial directory as seen in block 218. As previously discussed, the user selects and activates a phone book file from the display menu 30 and selects a speed dial directory from the speed dial file display menu 40. Then using either the phone keypad function keys or function keys of the application program interfacing the user with the software, the user makes the desired selection thereby associating the directories with the activated NAM. After the activated NAM has been associated with the desired phone book and/or the speed dial directory the user either automatically or manually dials the phone number and the software sends it to the cellular phone which in turn uses it to establish the communication connection with the target device. Accordingly, the present invention allows any NAM to be activated simultaneously with any phone book, speed dial directory or either phone feature.

Figure 3A:
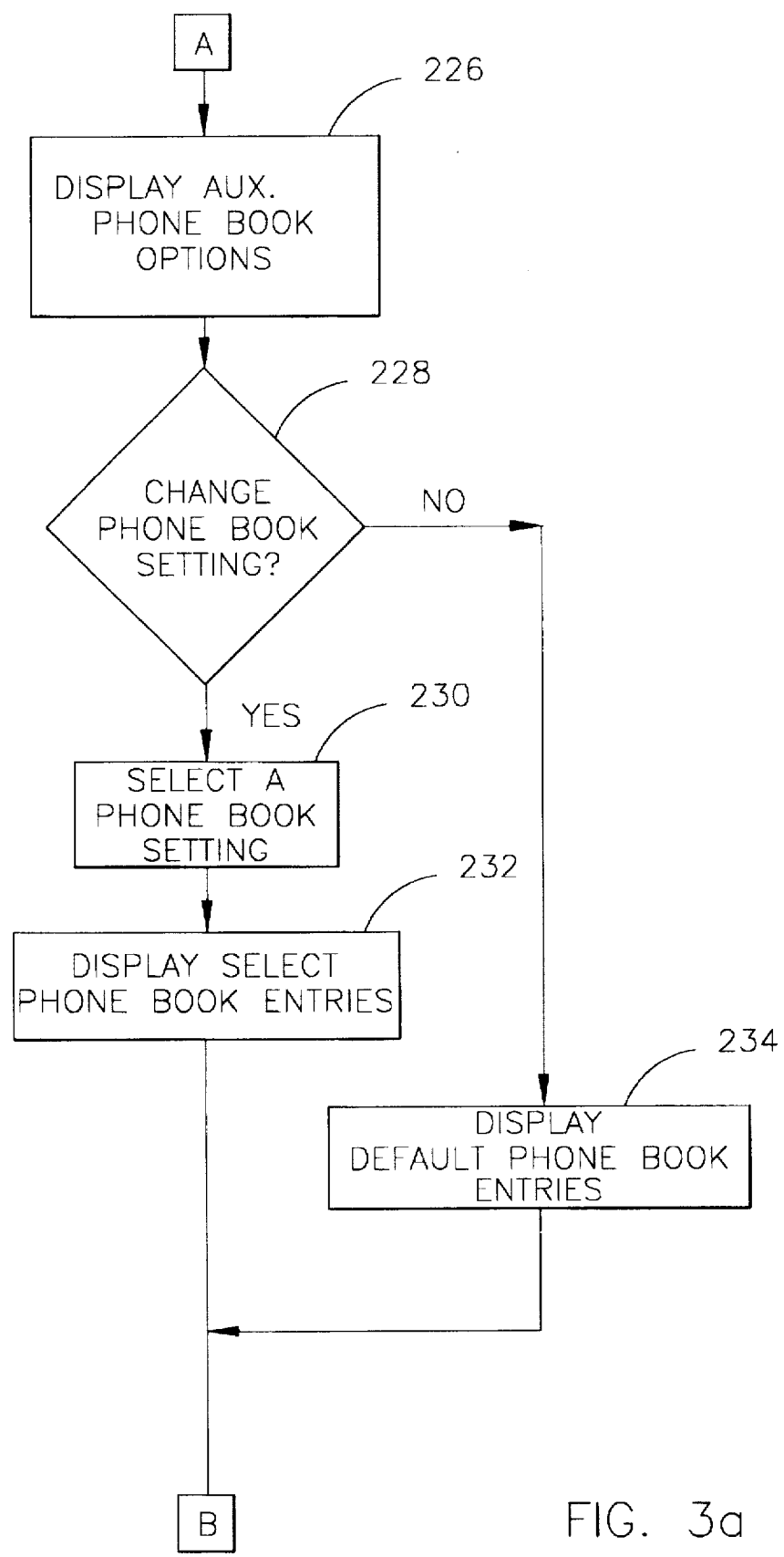

The user may add, change, or delete a NAM, phone book or speed dial entry at any time by electing the desired option, shown in the preferred embodiment 300 of the instant invention, e.g. in FIG. 3–3A. To begin, the user powers the communication module, activating the default NAM under which the phone operates. See blocks 310–312. The application software which operates the data, facsimile, telephone, speed dials and/or phone books is routed into the NAM options by the user selecting in the equivalent of an affirmative to enter these options by pressing the appropriate function key at the user interface. See block 314. When in the NAM options the software prompts the cellular phone to determine which NAM to activate by displaying the NAM options. The user, from the user interface 60, then selects a new NAM which activates the NAM through a switch function based on the input of the keystroke. See blocks 318–320. Many hand held cellular phones simply switch Nams through keystrokes, such as function keys that correspond to Nam numbers, to activate the Nam. The hardware employed to switch Nams or phone number directories may be any conventional or contemporary device. The instant invention is more concerned with freely associating phone books, speed dial directories and possibly other features with any activated NAM. The NAM options may be bypassed if the user decides to operate under the default NAM setting, since the default NAM is automatically activated when booting up the communication module. Likewise, a given phone book and speed dial register are also programmed as the default phone book and speed dial register, usually based on the NAM programmed as the default. The default settings for the NAMs, phone books, or speed dial registers may be changed at any time to new default settings by the user.

Referring to block 322 in FIG. 3, a default phone book is automatically selected based on the activated NAM. Thus, if the original default NAM is the selected NAM by the user then the phone book associated with that default NAM is activated by the user opting to bypass the NAM options. Likewise, if an auxiliary NAM is selected in the NAM options then the corresponding default phone book for that activated NAM would be activated, as shown in block 322. The phone book activated may be changed by entering into the phone book options as seen in block 224. If the user decides to utilize the default phone book activated then the option is bypassed and the user has a choice of utilizing another feature such as a speed dial option or manually entering the desired phone number by bypassing the other features. If the user decides to access the phone book options then an equivalent affirmative response is entered into the processing means by manipulating the desired key or function key. See block 224. The user then has the option of maintaining the default phone setting or selecting and activating an auxiliary phone book based on the phone book options shown in the display which may be activated by entering into the phone book options. See blocks 226 and 228. If the user decides to maintain the default phone book based on the display of options then the user bypasses the phone book options or selects the default setting. After selecting the default a display of the default phone book entries is shown for the user to scroll through in selecting the number to be dialed. See block 234. However, if the user decides to change the phone book setting to an auxiliary directory then an affirmative response is entered at the user input 60. Subsequently, the various phone book options are displayed and a selection is made by manipulating the corresponding function key. See block 230. After selecting the desired phone book a display of the phone book's entries are shown allowing the user to scroll through the phone book entries to find the desired number to be dialed. See block 232.

The user in the preferred embodiment also has the option of activating an auxiliary speed dial directory as shown in decision block 238. Once a phone book is selected, the default speed dial directory corresponding to the activated phone book is activated. The speed dial directory provides a convenient quick access file which corresponds to a particular phone book wherein the speed dial directory may contain the most frequently dialed numbers from the associated phone book or emergency numbers. However, any auxiliary speed dial directory may be selected to associate with the selected phone book. If no auxiliary phone book is selected then the default speed dial directory will correspond to the default phone book associated with the activated NAM. See block 236. If the user decides to maintain the default speed dial directory then the speed dial options are bypassed. The user may activate the speed dial directory options by imputing an affirmative response from the function keys or by manipulating the appropriate function key which in turn causes a display of speed dial directory options to be activated. See block 240. Based on the display of options, the user either selects an auxiliary speed dial directory or decides to maintain the default setting. See block 242. The user selects the default speed dial directory by bypassing the auxiliary speed dial file options, or just by selecting the default option. To select an auxiliary option the user chooses a speed dial directory from the auxiliary list by manipulating the appropriate function key, which in turn activates the auxiliary speed dial directory selected. See block 244. Based on the speed dial directory selected, the corresponding phone number entries are displayed on the user interface for the user's selection. See block 246. A phone number from the speed dial directory may be automatically or manually entered as shown in blocks 248 and 250. A speed dial number is automatically entered by hitting the appropriate function key as directed by the speed dial directory or in the instance of a computer application program by highlighting the appropriate speed dial number on the screen and manipulating the enter button. To manually enter a phone number the user just types in the phone number into the communication module as conventionally known. Once the number is entered, it is dialed and sent to establish a communication connection with the target device. See blocks 252 and 254.

Accordingly, the user may switch between NAM settings at any time while the program is active. If the user changes the NAM setting, the application program will check for the associated phone book and/or speed dial directory based on the initial settings or identification codes of these as originally programmed. Each of the NAMs, phone books and speed dial directories are switched by application program inputs or function key strokes to correlate the NAMs and directories in the most logical manner. The user, however, may deviate from the default associations. Each phone book directory and speed dial directory has indicators so that the user may identify the directories in accordance with their needs. For instance, the indicators may merely contain the NAM which usually associates with the directory. The user of the communications module may correlate the most appropriate phone book and/or speed dial directory with the activated NAM by scrolling through the phone book directory options and speed dial directory options and matching the NAM setting with the particular indicator. To enter either the phone book options or speed dial directory options the user makes an affirmative entry to activate the options. The user, however, may bypass either option or both options.

In either event, the user may interchange any phone book or speed dial directory to operate in conjunction with any NAM which is activated. In the alternative embodiment, the user may change the initial phone book or speed dial directory settings which correspond with particular NAM settings at any time. This is accomplished by modifying the default settings of the phone books and speed dial directories associated with particular NAM settings. Most importantly, it is desired that complete flexibility be available for the end user. Therefore, it is preferred that a menu of phone book options with indicators informing the user of the most practical NAM to associate the phone book or speed dial directory be utilized. However, pre-programming the cellular phone device with associating schemes for matching the phone books and speed dial directories with particular NAMs is typically the preferred mode. Nonetheless, the option still exists for the end user to selectively interchange phone books and/or speed dial directories to match with any desired NAM which is activated.

Figure 4A:
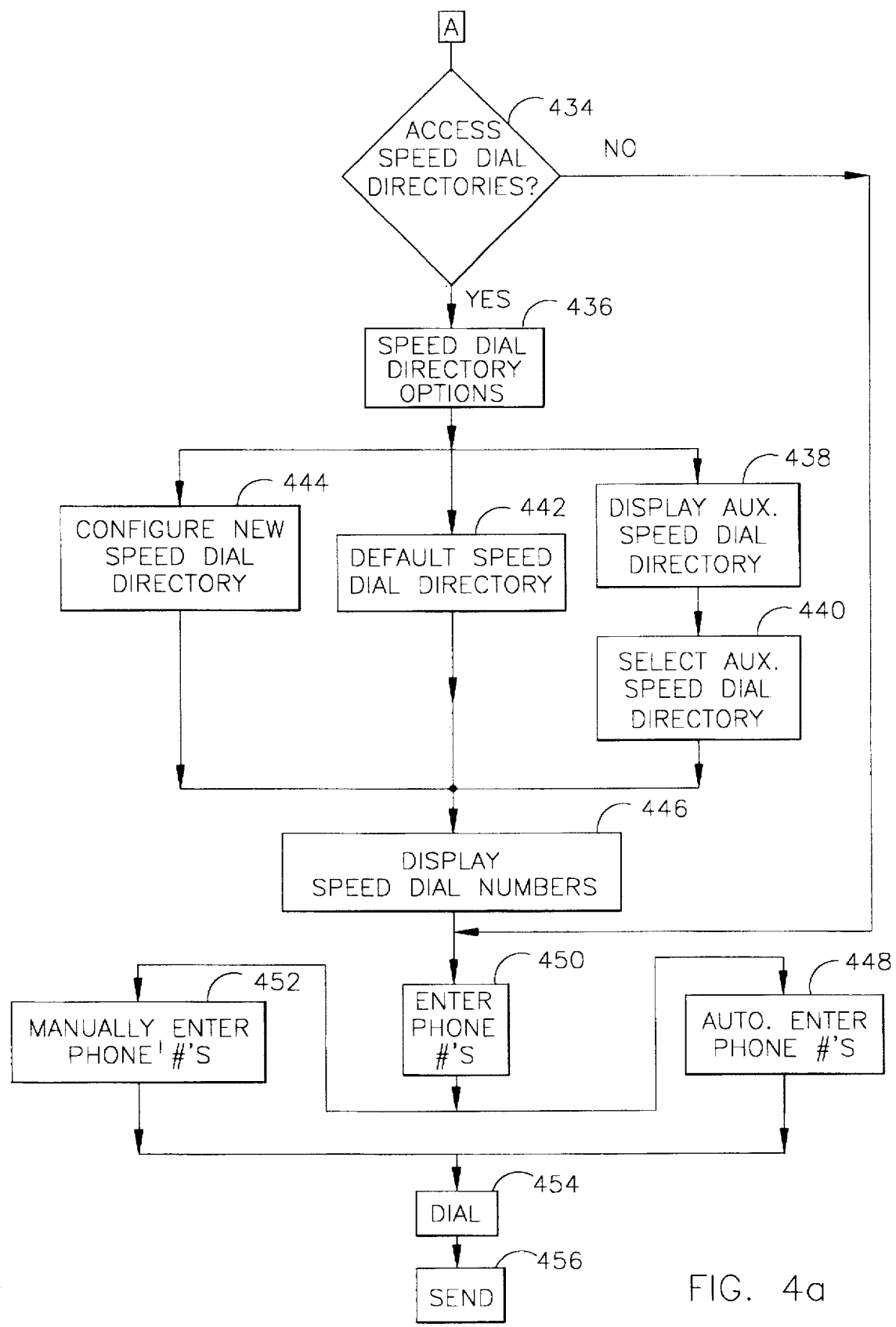

Referring to FIGS. 4-4A, another embodiment of the instant invention is shown wherein the method for associating phone books, speed dial directories and other phone features to cellular NAMs is shown in a somewhat simplified form. As in all methods for associating a phone's option features with the individual NAMs, the phone or mobile communication module is powered, as shown in block 410, and the user enters the NAM options, block 412, via the application program or function keys accessible on the communication device or user interface. In the NAMs option menu the user has the option of configuring a new NAM, utilizing the default NAM setting or selecting an auxiliary NAM. See blocks 414, 416 and 418. Similar to all embodiments, each NAM is identified by either identification codes, description fields which are familiar to the operating software or to function keys. When selecting a NAM setting the code merely selects and triggers the NAM according to its identifier. After selecting a NAM to operate the phone under, the user may access the phone book options menu, as seen in block 420. The user may directly bypass the phone book options to enter other options or to dial a phone number address manually. However, to access the phone book options menu for associating a phone book with the activated NAM, the user sends the equivalence of an affirmative command. This is typically in response to either a menu selection or question in an application program or via a function key accessible from the communication module. See blocks 420 and 422. The phone book options menu gives the user a choice of configuring a new phone book, block 424, activating a default phone book, block 430, or displaying an auxiliary phone book or phone books for selecting the same, see blocks 426 and 428. The default phone books typically correspond to the NAM activated wherein an actual phone book identifier is matched with the NAM identifier when the actual NAM selected is activated. However, the option exists to configure a new phone book or to select an auxiliary phone book to use with the NAM activated. The phone books displayed in the menu options contain indicators visible to the user to help make an informed decision based on the activated NAM. Once a phone book has been selected and activated the phone book numbers are displayed in either a menu form for large screen displays or scrolled in one line increments in smaller displays such as those on conventional portable phones. See block 432.

With reference to FIG. 4A, the user may also access and activate speed dial directories either directly after selecting a NAM or after selecting a phone book option. The user has the option of bypassing the speed dial directory menu options and dialing a phone number or speed dial number directly from memory by going straight to block 450 in the flow diagram. To enter the speed dial directory menu the user, as before, enters into the speed dial directory options, see block 436. The user may either configure a new speed dial directory, block 444, utilize the speed dial directory, block 442, or select an auxiliary speed dial directory, block 440. The default speed dial directory is automatically activated when a phone book option is selected by comparing identification codes of both directories or based on the NAM setting if no phone book option is selected. The speed dial directories each have identification codes which correspond with the phone books and NAM settings. Therefore, if no phone book option is selected then the default phone book is automatically activated based on the NAM setting which in turn activates the corresponding speed dial directory. The user may select an auxiliary speed dial directory by choosing a speed dial directory indicated in the display of auxiliary speed dial directory options. See blocks 430 and 440. After selecting the speed dial directory via the application program or function keys on the mobile communication module, the numbers of the directory selected are displayed. A number is then selected and entered either manually or automatically as shown in blocks 448 to 452. They may be entered automatically via a function key or by highlighting and entering the highlighted number with an enter key on the mobile communication module. Subsequently the number is dialed and sent thereby establishing a connection with the target communication module. See blocks 454 and 456.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for creating and associating phone number directories and speed dial directories programmed into a programmable mobile cellular communication device with an individual number assignment module (NAM) setting defined by the mobile cellular communication device such that when activated the directories are simultaneously available with any activated NAM setting, wherein the mobile cellular communication device is programmed with a plurality of directories for storing phone numbers and a plurality of NAM setting options with one NAM setting being a default NAM and the other NAM setting options being auxiliary NAM options, wherein each NAM setting stores carrier assigned phone numbers under which the mobile communication device is identified and operated, said method comprising the steps of:

(a) automatically activating said default NAM setting defined by the mobile cellular communication device when powering up said device;

(b) individually establishing for each NAM setting at least one default directory from said plurality of directories;

(c) automatically activating said default directory that correlates with said activated default NAM setting as defined such that phone numbers in the at least one default directory are simultaneously accessible for use when operating under said activated default NAM setting;

(d) providing an option to select and activate an auxiliary NAM option from said plurality of NAM setting options so as to operate the device under the auxiliary NAM rather than said default NAM;

(e) selecting one of said auxiliary NAM options for operating the device under the carrier assigned number found stored in said selected auxiliary NAM;

(f) activating said selected auxiliary NAM option;

(g) individually establishing for each NAM setting at least one corresponding directory from said plurality of directories for automatically associating with each said NAM setting; and (h) activating said at least one corresponding directory in response to activation of a selected auxiliary NAM setting.

2. A method as recited in claim 1, further comprising the step of:

deactivating activated directories when activating said corresponding directory selected.

3. A method as recited in claim 1, further comprising the step of:

comparing said plurality of directories with said activated NAM to find said at least one default directory that is programmed to correlate with said activated NAM.

4. A method as recited in claim 1, further comprising the step of:

providing a display of said auxiliary NAM options from which said auxiliary NAM option is selected.

5. A method as recited in claim 3, further comprising the step of:

entering into a program menu of said auxiliary NAM setting options before selecting said auxiliary NAM option; and entering into a program menu of said plurality of directories after said at least one default directory is activated.

6. A method as recited in claim 5, further comprising the step of:

selecting and activating at least one directory from said plurality of directories so as to associate said activated directory with said activated NAM option.

7. A method as recited in claim 1, further comprising the step of:

selecting and activating at least one directory from said plurality of directories so as to associate said activated directory with said activated NAM option.

8. A method as recited in claim 1, further comprising the step of:

entering into a program menu of said auxiliary NAM setting options before selecting said auxiliary NAM option; and entering into a program menu of said plurality of directories after said at least one default directory is activated.

9. A method for automatically associating respective phone number directories retained in the storage of a mobile communication device with one or more corresponding number assignment module (NAM) settings of said device where said device has designation that makes a NAM setting the active NAM setting and designation that makes a directory the active directory that is initially accessed, said method comprising the steps of:

(a) associating each phone directory with one or more corresponding NAM settings for which it is the desired active directory;

(b) establishing the phone directory of the default active NAM setting as the default active phone directory;

(c) detecting any change to the current NAM setting;

(d) designating, in response to a change in the active NAM setting, the active phone directory as inactive; and (e) designating, in response to a change in the active NAM setting, the phone directory associated with the new active NAM setting as the active phone directory.

10. The method of claim 9 comprising the further step of:

(a) detecting a request to select an alternative directory and (b) accepting an alternative phone directory selection (c) designating the selected directory as the active directory.

11. A method as recited in claim 1 further comprising the step of:

(a) providing an operator selectable option to activate another directory corresponding to the activated NAM.

* * * * *